United States Patent Office 2,891,081
Patented June 16, 1959

2,891,081
VITAMIN A ALDEHYDE DERIVATIVES AND PRODUCTION THEREOF

Takuichi Miki, Amagasaki, and Yujiro Hara, Kobe, Japan, assignors to Takeda Pharmaceutical Industries, Ltd., Osaka, Japan No Drawing. Application July 15, 1957
Serial No. 671,732

Claims priority, application Japan July 20, 1956

10 Claims. (Cl. 260—404.5)

This invention relates to new and useful derivatives of vitamin A aldehyde and to the preparation of such derivatives, the latter being characterized by vitamin A activity.

Vitamin A aldehyde (retinene) is a pentaenaldehyde and is produced by oxidation of vitamin A alcohol obtained from cod liver oil, etc., or by synthesis from β-ionone via a number of intermediates. Vitamin A aldehyde is asserted to have a vitamin A activity equal to that of vitamin A alcohol, but is somewhat less stable than the latter. Vitamin A aldehyde, as well as vitamin A, is usually obtained as a water-insoluble oily substance, and these properties are inconvenient in the working up of the materials into a form useful for medicinal purposes. Efforts have therefore been made to convert the said materials into solid form as well as to solubilize the vitamin A oil, with increase in the stability.

The present invention has been addressed to the said problem and provides a solution thereof in the form of a new class of vitamin A aldehyde derivatives, namely, the retinylidene acylhydrazines, which satisfy the requirements of the art as to properties (solid form, solubility, stability).

The new retinylidene acylhydrazines of the present invention correspond to the formula

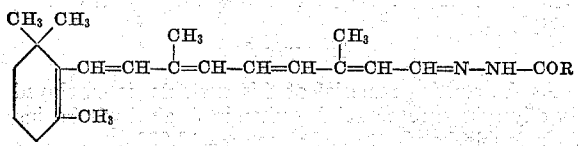

wherein R stands for a hydrocarbon radical, which may or may not be substituted. The compound called vitamin A aldehyde in this specification has the fundamental structure

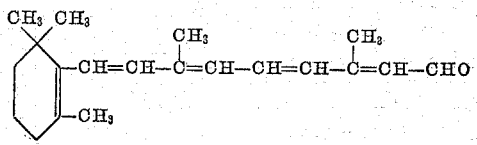

which represents all the geometric isomers. The corresponding moiety (A) of the present vitamin A aldehyde derivatives, herein termed the retinylidene radical, likewise encompasses the said isomeric forms.

According to the present invention, the retinylidene acylhydrazines are prepared by reacting vitamin A aldehyde or a substance containing the same with appropriate acylhydrazines. The vitamin A aldehyde may be used in the pure or substantially pure form or, as indicated, in the form of a substance containing the same, even in a low content. For example, use may be made of the vitamin A aldehyde oil prepared from natural vitamin A concentrate and which has a low content of vitamin A aldehyde. Since the present invention may thus make use of a substance containing vitamin A aldehyde in such a low content in the preparation of the retinylidene acylhydrazines, the invention is useful in the concentration of vitamin A oil.

The vitamin A aldehyde, starting material, may have any geometrical configuration, the resultant product according to the invention having the corresponding configuration. Thus, where the starting compound has all its double bonds in the trans-configuration, the obtained product will likewise be in the all-trans-configuration.

The acylhydrazines which are reacted with the vitamin A aldehyde are known compounds corresponding to the formula $$R—CO—NH—NH_2$$

wherein R has the previously indicated significance. The R radical may be a higher or lower acyclic, cyclic or polycyclic radical, and may be unsaturated. It may contain a wide variety of substituents, for example, halogen, hydroxyl, thiol, amino, nitro, carboxyl groups and groups derived from these. The following table shows examples of R within the scope of the present invention, and indicates the properties of the vitamin A aldehyde derivatives prepared from vitamin A aldehyde and the respective acylhydrazines:

| R | Melting Point, °C. | Solvent for Recrystallization | Crystal form [1] |
|---|---|---|---|
| $CH_3—$ | 180 | Ethanol | orange-yellow needles. |
| $C_3H_7—$ | 177 | do | yellow scales. |
| $C_7H_{15}—$ | | | |
| $C_9H_{19}—$ | 126 | Ethanol | yellow needles. |
| $C_{11}H_{23}—$ | 116 | do | Do. |
| $C_{13}H_{27}—$ | 106 | do | Do. |
| $C_{15}H_{31}—$ | 96 | do | yellow scales. |
| $C_{17}H_{35}—$ | 38-40 | Acetone | yellow grains. |
| $C_6H_{13}CH(OH)CH_2CH:CH(CH_2)_7—$ | 95-98 | Ethanol | yellow crystals. |
| $CH_2OH(CHOH)_4—$ | 159-161 | do | yellow cubes. |
| $C_6H_5—$ | 185 | do | pale yellow needles. |
| $p-HO-C_6H_4—$ | 150-154 | | (yellow powder.) |
| $p-NO_2—C_6H_4—$ | 174 | Ethanol | orange-yellow cubes. |
| $p-NH_2—C_6H_4—$ | 130-140 | | (red-brown powder.) |
| $p-HOOC—_6H_4—$ | 203 | Dilute ethanol | gray-brown cubes. |
| Sodium salt of the above | >350 | | (red-brown powder.) |

[1] Crystal form in parentheses shows that before recrystallization.

The reaction between the vitamin A aldehyde and the acylhydrazines is advantageously carried out in a solvent, preferably a lower aliphatic alcohol such as tertiary butanol, isopropanol, ethanol or methanol. However, other solvents may also be used, such for example as ethers such as dioxan, dibutylether and tetrahydrofuran, esters such as ethyl acetate and butyl acetate, fatty acids such as acetic acid, acetonitrile, aliphatic or aromatic hydrocarbons, aliphatic or aromatic nitro compounds, dimethyl formamide, water, and acetic anhydride. If necessary, a mixture of the above solvents may be used. The reaction generally proceeds at room temperature (20 to 30° C.) but it may be accelerated by heating. Addition of a trace of an acid such as sulfuric acid, hydrochloric acid, phosphoric acid, oxalic acid and acetic acid makes the reaction proceed more smoothly. One or more of tocopherol, hydroquinone, and quinoline may be added to prevent side-reactions, such as oxidation and polymerization.

The retinylidene acylhydrazines thus produced are isolated from the reaction mixture by suitable means. In some cases, the precipitated product, which is generally insoluble or sparingly soluble in organic solvents, is separated merely by filtering. In other cases, the solvent is distilled off and the residue is washed or extracted with an organic solvent to remove impurities. Or the reaction mixture is concentrated and a suitable organic solvent is added to precipitate the product. Organic solvents to be used in these cases include, for example, ether, benzene, petrolic solvents, and acetone. The crude retinylidene acylhydrazines thus separated are generally crystalline or powdery substances, which are purified by recrystallization from a proper solvent.

The new retinylidene acylhydrazines of the present invention are very useful because of their vitamin A activity, notwithstanding the fact that their properties are very different from those of vitamin A alcohol. The new vitamin A aldehyde derivatives are stable and crystalline or powdery, and therefore satisfy the desideratum of having the products in solid form. For example, when vitamin A palmitate (an oily substance) is left standing in the air at 37° C., the residual content thereof at the end of three days is only 20%, whereas the new retinylidene acylhydrazines show a residual content of over 50% even when allowed to stand at 40° C. for 30 days, and some of them show as high a residual content as 90–100%. That is, the retinylidene acylhydrazines are superior beyond comparison to vitamin A esters in stability. Moreover, of the retinylidene acylhydrazines, those having a hydrophilic group such as carboxyl and amino group are generally soluble in water, and therefore satisfy the object of solubilization of vitamin A.

The new compounds are useful in the treatment of vitamin A deficiency, and for all other purposes for which vitamin A is useful. They may be administered orally, an appropriate dose being e.g. 25,000 to 50,000 I.U./day. Moreover, the compounds are also useful, by making use of the afore-specified properties, in the fortification of foods such for example as margarines, dairy products, canned goods and confectionery.

The following examples set forth exemplary and presently preferred embodiments of the invention. These examples are intended to be illustrative and not at all limitative in character. In the said examples, the percentages are by weight, unless otherwise indicated. The temperatures are in degrees centigrade. Melting points are uncorrected. All of ultraviolet absorptions appearing in the examples were observed in ethanol solution. The stability was tested by leaving 0.37–0.40 g. of the sample in a brown glass tube with a diameter of 1.5 cm. at 40° C., without sealing, and the residual content at the end of 30 days is shown in percentage. The vitamin A activity of the samples was assayed by the method of U.S.P. XIV and the potency of 1 mol of the samples was compared with that of 1 mol of vitamin A. All were found to have vitamin A activity.

The vitamin A aldehyde (purity, ca. 45% used in each example except when particularly noted was produced by manganese dioxide oxidation of concentrated vitamin A alcohol obtained from cod liver oil. The ratio of neo-vitamin A aldehyde (2-monocis) to all-trans vitamin A aldehyde is approximately 1:2 (cf. Ch. D. Robeson and J. G. Baxter, J. Am. Chem. Soc. 69, 136 (1947)).

Example 1

To 1.5 grams of vitamin A aldehyde (purity ca. 45%) dissolved in 10 milliliters of alcohol is added a solution consisting of 0.5 gram of acetylhydrazine, 10 milliliters of ethanol and a drop of glacial acetic acid. After heating on a water-bath for one hour, the mixture is concentrated under reduced pressure to leave a reddish brown oily substance. Ten milliliters of petroleum ether (B.P. 60–80°) is added to the residue and the mixture is left standing to separate 0.6 gram of crude crystals (M.P. 170–174°). After recrystallization from ethanol, retinylidene acetylhydrazine is obtained as orange yellow needles, M.P. 180°.

Ultraviolet absorption: $\lambda_{max}$ 381 m$\mu$ ($\epsilon$=52,000).

Analysis.—Calcd. for $C_{22}H_{32}ON_2$: C, 76.69%; H, 10.53%; N, 8.13%. Found: C, 77.05%; H, 10.35%; N, 8.71%.

Example 2

A solution comprising 2.8 grams of vitamin A aldehyde (purity ca. 45%), 1.1 grams of butyroylhydrazine, a drop of glacial acetic acid and 20 milliliters of ethanol is heated on a water-bath for one hour, and then the reaction mixture is concentrated under reduced pressure to obtain a reddish brown oily substance. To the substance is added 20 milliliters of petroleum ether (B.P. 60–80°), and the solution is left standing to precipitate 1.2 grams of crude crystals, M.P. 170–174°. The product is recrystallized from ethanol to give retinylidene butyroylhydrazine as yellow scales, M.P. 177°.

Ultraviolet absorption: $\lambda_{max}$ 382 m$\mu$ ($\epsilon$=62,000).

Analysis.—Calcd. for $C_{24}H_{36}ON_2$: C, 78.21%; H, 9.85%; N, 7.60%. Found: C, 77.96%; H, 9.93%; N, 7.64%.

Example 3

As the starting material of this example, is employed an oily substance containing vitamin A aldehyde having 6-cis-double bonds ($\lambda_{max}$ 368 m$\mu$, $\epsilon$=18,000).

A solution comprising 2.9 grams of the vitamin A aldehyde oil, 1.5 grams of butyroylhydrazine, 0.03 gram of tocopherol, a drop of glacial acetic acid and 40 milliliters of ethanol is boiled on a water-bath for 3 hours, and the solvent is distilled off. Ether is added to the residue, and the ethereal solution is washed with water three times. After the ethereal solution is dried over anhydrous sodium sulfate, the solvent is distilled off. Seven milliliters of petroleum ether (B.P. 30–60°) is added to the residue to separate 2.7 grams of crude crystals. After recrystallization from ethanol, retinylidene butyroylhydrazine is obtained as pale yellow needles, M.P. 178°. The product shows no depression of melting point when mixed with the product produced in Example 2.

Ultraviolet absorption: $\lambda_{max}$ 381–383 m$\mu$ ($\epsilon$=73,000).

Analysis.—Calcd. for $C_{24}H_{36}ON_2$: C, 78.21%; H, 9.85%; N, 7.60%. Found: C, 78.30%; H, 9.83%; N, 7.63%.

Example 4

To a solution comprising 0.5 gram of vitamin A aldehyde (purity ca. 45%) and 5 milliliters of ethanol is added 0.6 gram of caprinoylhydrazine dissolved in 5 milliliters of ethanol. After boiling for 5 hours, the mixture is concentrated. A small amount of petroleum ether is added to the residue, and the resulting solution is cooled to separate the unchanged material, which is removed by filtration. The mother liquor is kept standing in a cold place to give a crystalline substance. On recrystallization of the substance from ethanol, 0.1 gram of retinylidene caprinoylhydrazine is obtained as yellow needles, M.P. 126°.

Ultraviolet absorption: $\lambda_{max}$ 381 m$\mu$ ($\epsilon$=62,000).

Analysis.—Calcd. for $C_{30}H_{48}ON_2$: C, 79.59%; H, 10.69%; N, 6.19%. Found: C, 79.47%; H, 10.46%; N, 6.73%.

Example 5

To 0.5 gram of vitamin A aldehyde (purity ca. 45%) dissolved in 5 milliliters of ethanol is added a solution consisting of 0.6 gram of lauroylhydrazine and 10 milliliters of ethanol. After boiling for 5 hours, the solvent of the reaction mixture is evaporated, and the residue is diluted with petroleum ether. On cooling, the unchanged material separates from the solution, which is filtered off. The filtrate is concentrated under reduced pressure and the residue is dissolved in ethanol and cooled to deposit a crystalline substance. Recrystallization from ethanol gives 0.1 gram of retinylidene lauroylhydrazine as yellow needles, M.P. 116°.

Ultraviolet absorption: $\lambda_{max}$ 381 m$\mu$ ($\epsilon$=61,000).

Analysis.—Calcd. for $C_{32}H_{52}ON_2$: C, 79.94%; H, 10.90%; N, 5.83%. Found: C, 79.87%; H, 10.60%; N, 5.90%.

Example 6

To a solution comprising 0.5 gram of vitamin A aldehyde (purity ca. 45%), 0.64 gram of myristoylhydrazine and 10 milliliters of ethanol is added 0.3 milliliter of glacial acetic acid. After boiling for one hour, the solvent of the mixture is evaporated, and the residue is left standing in a cold place to separate a crystalline substance. Recrystallization of the product from ethanol gives 0.1 gram of retinylidene myristoylhydrazine as yellow needles, M.P. 106°.

Ultraviolet absorption: $\lambda_{max}$ 380 m$\mu$ ($\epsilon$=68,000).

Analysis.—Calcd. for $C_{34}H_{56}ON_2$: C, 80.26%; H, 11.09%; N, 5.51%. Found: C, 80.22%; H, 10.92%; N, 5.83%.

Example 7

A solution comprising 2.0 grams of vitamin A aldehyde (purity ca. 45%), 1.0 gram of palmitoylhydrazine, a drop of glacial acetic acid and 30 milliliters of ethanol is heated on a water-bath for one hour, and the mixture is concentrated under reduced pressure to leave a reddish brown oily substance. Fifteen milliliters of petroleum ether (B.P. 60–80°) is added to the residue, and the solution is left standing to separate 1.2 grams of crude crystals. Recrystallization of this product from ethanol gives retinylidene palmitoylhydrazine, as yellow scales, M.P. 96°.

Ultraviolet absorption: $\lambda_{max}$ 382 m$\mu$ ($\epsilon$=44,700).

Analysis.—Calcd. for $C_{36}H_{60}ON_2$: C, 80.53%; H, 11.27%; N, 5.23%. Found: C, 80.21%; H, 11.57%; N, 5.99%.

Example 8

To a solution consisting of 5 grams of vitamin A aldehyde, 5.3 grams of stearoylhydrazine and 50 milliliters of ethanol, 0.5 milliliter of glacial acetic acid is added. After boiling for one hour, the reaction mixture is diluted with water. The separated substance is recrystallized once from ethanol and twice from acetone to obtain 2.3 grams of retinylidene stearoylhydrazine, as yellow grains, M.P. 38–40°.

Ultraviolet absorption: $\lambda_{max}$ 376 m$\mu$ ($\epsilon$=41,000).

Analysis.—Calcd. for $C_{38}H_{64}ON_2 \cdot H_2O$: C, 78.29%; H, 11.41%; N, 4.81%. Found: C, 78.43%; H, 11.23%; N, 4.86%.

Example 9

To a solution comprising 0.5 gram of vitamin A aldehyde (purity ca. 45%), 0.55 gram of ricinoleoylhydrazine and 10 milliliters of ethanol, is added three drops of glacial acetic acid. After boiling for one hour, the mixture is concentrated. The residue is dissolved in ether, and the ether solution is washed with water. After drying over anhydrous sodium sulfate, the ether layer is concentrated, and a small amount of petroleum ether is added to the residue to separate a crystalline substance. Recrystallization of the product from ethanol gives retinylidene ricinoleoylhydrazine as yellow crystals, M.P. 95–98°.

Ultraviolet absorption: $\lambda_{max}$ 378 m$\mu$ ($\epsilon$=45,000).

Example 10

A solution comprising 4.5 grams of vitamin A aldehyde (purity ca. 56%), 3.0 grams of gluconoylhydrazine and 50 milliliters of ethanol is boiled for 3 hours on a water-bath, and the unchanged gluconoylhydrazine is removed by filtration. The filtrate is concentrated under reduced pressure, and 30 milliliters of acetone is added to the viscous residue to separate 3.2 grams of crude crystals melting over 150°. The product is recrystallized from ethanol to give retinylidene gluconoylhydrazine, as yellow cubes, M.P. 159–161°. The solubility in water of the product is 6.6×10⁻⁴ at 20°.

Ultraviolet absorption: $\lambda_{max}$ 380 m$\mu$ ($\epsilon$=51,500).

Example 11

To 1 gram of vitamin A aldehyde (purity ca. 45%) dissolved in 5 milliliters of ethanol is added a solution comprising 0.4 gram of benzoylhydrazine, 5 milliliters of ethanol and a drop of glacial acetic acid. After heating on a water-bath for 3 hours, the mixture is concentrated under reduced pressure to give a reddish brown oily substance. A small amount of ethanol is added to the substance and the mixture is left standing at low temperature, whereupon 0.5 gram of crude crystals separate out. Recrystallization from ethanol gives retinylidene benzoylhydrazine as pale yellow needles.

Ultraviolet absorption: $\lambda_{max}$ 240 m$\mu$ ($\epsilon$=9,900), 388–392 m$\mu$ ($\epsilon$=67,000).

Analysis.—Calcd. for $C_{27}H_{34}ON_2$: C, 80.55%; H, 8.51%; N, 6.96%. Found: C, 80.54%; H, 8.40%; N, 6.74%.

Example 12

To 1 gram of vitamin A aldehyde (purity ca. 45%) dissolved in 5 milliliters of ethanol is added a solution comprising 0.4 gram of p-hydroxybenzoylhydrazine, 10 milliliters of ethanol and a drop of glacial acetic acid. The mixture is heated on a water-bath for three hours, and then concentrated under reduced pressure to leave a reddish brown oily substance. To the residue is added 50 milliliters of ether, and the ethereal solution is heated on a water-bath for awhile. The ether-insoluble substance is collected by decantation. The treatment with ether and the purification by decantation are repeated three times respectively, and the insoluble substance is dried, whereupon 0.8 gram of retinylidene p-hydroxybenzoylhydrazine is obtained as yellow powder, M.P. 150–154°.

Ultraviolet absorption: $\lambda_{max}$ 382–385 m$\mu$ ($\epsilon$=47,700).

Analysis.—Calcd. for $C_{27}H_{34}O_2N_2$: C, 77.47%; H, 8.19%; N, 6.69%. Found: C, 76.04%; H, 8.34%; N, 6.53%.

Example 13

To 2.8 grams of vitamin A aldehyde (purity ca. 45%) dissolved in 30 milliliters of ethanol is added a solution comprising 1 gram of p-nitrobenzoylhydrazine, 300 milliliters of ethanol and a drop of glacial acetic acid. The solution is heated on a water-bath for one hour, and the reaction mixture is concentrated under reduced pressure to precipitate 2.5 grams of crude crystals. Recrystallization of the product from ethanol gives retinylidene p-nitrobenzoylhydrazine as orange yellow cubes, M.P. 174°.

Ultraviolet absorption: $\lambda_{max}$ 260 m$\mu$ ($\epsilon$=14,000) 400 m$\mu$ ($\epsilon$=50,000).

*Analysis.*—Calcd. for $C_{27}H_{38}O_3N_3$: C, 72.45%; H, 7.43%; N, 9.39%. Found: C, 72.37%; H, 7.60%; N, 8.82%.

Example 14

A solution comprising 2.8 grams of vitamin A aldehyde (purity ca. 45%), 1.3 grams of p-aminobenzoylhydrazine, a drop of glacial acetic acid and 100 milliliters of ethanol is heated for 3 hours on a water-bath and then allowed to stand for 24 hours at room temperature. The reaction mixture is concentrated under reduced pressure to leave a reddish brown oily substance. To the substance is added 50 milliliters of ether, then the ethereal solution is boiled on a water-bath, whereupon impurities contained in the vitamin A oil are dissolved. The ether-insoluble substance is collected by decantation. After repeating the same procedure three times, the ether-insoluble substance is dried to give 2.2 grams of retinylidene p-aminobenzoylhydrazine as reddish brown powder, M.P. 130–140°.

Ultraviolet absorption: $\lambda_{max}$ 382–385 m$\mu$ ($\epsilon$=51,000).

*Analysis.*—Calcd. for $C_{27}H_{35}ON_3$: C, 77.66%; H, 8.45%; N, 10.06%. Found: C, 76.77%; H, 8.59; N, 10.12%.

Example 15

A solution comprising 2.8 grams of vitamin A aldehyde (purity ca. 45%), 1.3 grams of p-carboxybenzoylhydrazine and 100 milliliters of ethanol is boiled for 30 minutes, and then concentrated under reduced pressure to give a dark red oily substance. To the substance a small amount of benzene is added, whereupon 2.7 grams of crude crystals separate out.

Recrystallization of the crystals from diluted ethanol gives retinylidene p-carboxybenzoylhydrazine as grayish brown cubes, M.P. 203°.

Ultraviolet absorption: $\lambda_{max}$ 240 m$\mu$ ($\epsilon$=17,000), 388 m$\mu$ ($\epsilon$=46,000).

*Analysis.*—Calcd. for $C_{28}H_{34}O_3N_2$: C, 75.30%; H, 7.67%; N, 6.27%. Found: C, 74.44%; H, 7.86%; N, 5.86%.

To the product is added a solution of sodium bicarbonate, whereupon the product is dissolved with vigorous evolution of carbon dioxide. The solution is concentrated under reduced pressure. To the residue ethanol is added, and the insoluble substance is separated by filtration. The filtrate is concentrated to dryness, whereupon the sodium salt of retinylidene p-carboxybenzoylhydrazine is obtained as reddish brown powder, M.P. over 350°. The product is soluble in water, ethanol and methanol.

Ultraviolet absorption: $\lambda_{max}$ 385 m$\mu$ ($\epsilon$=22,000).

Having thus disclosed the invention what is claimed is:

1. A compound having the formula

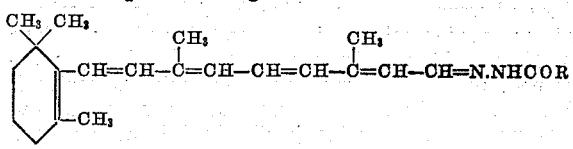

wherein R represents alkyl.

2. Retinylidene acetylhydrazine.
3. Retinylidene butyroylhydrazine.
4. Retinylidene benzoylhydrazine.
5. Retinylidene p-nitrobenzoylhydrazine.
6. Retinylidene p-aminobenzoylhydrazine.
7. Retinylidene ricinoleoylhydrazine.
8. Retinylidene gluconoylhydrazine.
9. Retinylidene p-hydroxybenzoylhydrazine.
10. Retinylidene p-carboxybenzoylhydrazine.

References Cited in the file of this patent

UNITED STATES PATENTS

| | | |
|---|---|---|
| 2,310,873 | Sauer | Feb. 9, 1943 |
| 2,721,215 | Goldberg et al. | Oct. 18, 1955 |
| 2,769,813 | Hermann | Nov. 6, 1956 |
| 2,785,200 | Moore | Mar. 12, 1957 |

OTHER REFERENCES

Ball et al.: Biochem. J., vol. 42, pp. 516–23 (1948).

UNITED STATES PATENT OFFICE

CERTIFICATE OF CORRECTION

Patent No. 2,891,081   June 16, 1959

Takuichi Miki et al.

It is hereby certified that error appears in the printed specification of the above numbered patent requiring correction and that the said Letters Patent should read as corrected below.

Columns 1 and 2, in the table, first column thereof, under the heading "R", next to the last item, for "p-HOOC-6H$_4$-" read -- p-HOOC-C$_6$H$_4$- --.

Signed and sealed this 27th day of October 1959.

(SEAL)
Attest:

KARL H. AXLINE
Attesting Officer

ROBERT C. WATSON
Commissioner of Patents